(12) United States Patent
Dalal et al.

(10) Patent No.: US 12,014,320 B2
(45) Date of Patent: Jun. 18, 2024

(54) SYSTEMS, DEVICES, AND METHODS FOR ESTIMATING STOCK LEVEL WITH DEPTH SENSOR

(71) Applicant: Walmart Apollo, LLC, Bentonville, AR (US)

(72) Inventors: Ravi Kumar Dalal, Dallas, TX (US); Bowen Gong, Centerton, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 362 days.

(21) Appl. No.: 16/991,980

(22) Filed: Aug. 12, 2020

(65) Prior Publication Data

US 2021/0049542 A1   Feb. 18, 2021

Related U.S. Application Data

(60) Provisional application No. 62/888,771, filed on Aug. 19, 2019, provisional application No. 62/885,695, filed on Aug. 12, 2019.

(51) Int. Cl.
*G06Q 10/087* (2023.01)
*B25J 9/16* (2006.01)
(Continued)

(52) U.S. Cl.
CPC .......... *G06Q 10/087* (2013.01); *B25J 9/1697* (2013.01); *G06Q 30/0633* (2013.01);
(Continued)

(58) Field of Classification Search
CPC ... G06Q 10/087; G01S 13/931; G01S 13/867; B60R 11/04
See application file for complete search history.

(56) References Cited

U.S. PATENT DOCUMENTS 5,074,594 A   12/1991   Laganowski
6,570,492 B1   5/2003   Peratoner
(Continued)

FOREIGN PATENT DOCUMENTS

CN   106347550 B   8/2019
CN   110348439 B   10/2019
(Continued)

OTHER PUBLICATIONS

Refills; "Final 3D object perception and localization"; European Commision, Dec. 31, 2016, 16 pages.
(Continued)

*Primary Examiner* — Florian M Zeender
*Assistant Examiner* — Vanessa Deligi
(74) *Attorney, Agent, or Firm* — Foley IP Law, PLLC

(57) ABSTRACT

Systems, apparatuses, and methods for scanning a shopping space. The system comprises a locomotion system, a 3D scanner system, and a central computer system. The locomotion system of a motorized unit comprises a locomotion controller and a motor. The 3D scanner system comprises a depth sensor and a 3D scanner processor configured to identify a 3D space associated with a storage area, estimate an occupied volume in the 3D space associated with the storage area based on a 3D scan from the depth sensor, and estimate a stock level of the storage area based on the occupied volume. The central computer system comprises a control circuit configured to receive estimated stock levels from the 3D scanner system and update an inventory database based on the estimated stock levels received from the 3D scanner.

19 Claims, 4 Drawing Sheets

(51) Int. Cl.
*G06Q 30/0601* (2023.01)
*G06T 7/521* (2017.01)
*G06T 7/62* (2017.01)
*H04W 4/029* (2018.01)

(52) U.S. Cl.
CPC ......... *G06Q 30/0639* (2013.01); *G06T 7/521* (2017.01); *G06T 7/62* (2017.01); *H04W 4/029* (2018.02)

(56) References Cited

U.S. PATENT DOCUMENTS

| | | |
|---|---|---|
| 8,923,650 B2 | 12/2014 | Wexler |
| 8,965,104 B1 | 2/2015 | Hickman |
| 9,275,308 B2 | 3/2016 | Szegedy |
| 9,477,955 B2 | 10/2016 | Goncalves |
| 9,526,127 B1 | 12/2016 | Taubman |
| 9,576,310 B2 | 2/2017 | Cancro |
| 9,659,204 B2 | 5/2017 | Wu |
| 9,811,754 B2 | 11/2017 | Schwartz |
| 10,002,344 B2 | 6/2018 | Wu |
| 10,019,803 B2 | 7/2018 | Venable |
| 10,032,072 B1 | 7/2018 | Tran |
| 10,129,524 B2 | 11/2018 | Ng |
| 10,210,432 B2 | 2/2019 | Pisoni |
| 10,373,116 B2 | 8/2019 | Medina |
| 10,572,757 B2 | 2/2020 | Graham |
| 10,592,854 B2 | 3/2020 | Schwartz |
| 10,839,452 B1 | 11/2020 | Guo |
| 10,922,574 B1 | 2/2021 | Tariq |
| 10,943,278 B2 | 3/2021 | Benkreira |
| 10,956,711 B2 | 3/2021 | Adato |
| 10,990,950 B2 | 4/2021 | Garner |
| 10,991,036 B1 | 4/2021 | Bergstrom |
| 11,036,949 B2 | 6/2021 | Powell |
| 11,055,905 B2 | 7/2021 | Tagra |
| 11,087,272 B2 | 8/2021 | Skaff |
| 11,151,426 B2 | 10/2021 | Dutta |
| 11,163,805 B2 | 11/2021 | Arocho |
| 11,276,034 B2 | 3/2022 | Shah |
| 11,282,287 B2 | 3/2022 | Gausebeck |
| 11,295,163 B1 | 4/2022 | Schoner |
| 11,308,775 B1 | 4/2022 | Sinha |
| 11,409,977 B1 | 8/2022 | Glaser |
| 2005/0238465 A1 | 10/2005 | Razumov |
| 2011/0040427 A1 | 2/2011 | Ben-Tzvi |
| 2014/0002239 A1 | 1/2014 | Rayner |
| 2014/0247116 A1 | 9/2014 | Davidson |
| 2014/0307938 A1 | 10/2014 | Doi |
| 2015/0363660 A1 | 12/2015 | Vidal |
| 2016/0203525 A1 | 7/2016 | Hara |
| 2017/0106738 A1 | 4/2017 | Gillett |
| 2017/0286773 A1* | 10/2017 | Skaff .................. H04N 5/23238 |
| 2018/0005176 A1 | 1/2018 | Williams |
| 2018/0018788 A1* | 1/2018 | Olmstead .............. G06V 20/00 |
| 2018/0108134 A1 | 4/2018 | Venable |
| 2018/0197223 A1 | 7/2018 | Grossman |
| 2018/0260772 A1 | 9/2018 | Chaubard |
| 2019/0025849 A1 | 1/2019 | Dean |
| 2019/0043003 A1* | 2/2019 | Fisher .................... G06V 10/82 |
| 2019/0050932 A1 | 2/2019 | Dey |
| 2019/0087772 A1* | 3/2019 | Medina ................ B64C 39/024 |
| 2019/0163698 A1 | 5/2019 | Kwon |
| 2019/0197561 A1 | 6/2019 | Adato |
| 2019/0220482 A1 | 7/2019 | Crosby |
| 2019/0236531 A1 | 8/2019 | Adato |
| 2020/0118063 A1* | 4/2020 | Fu .......................... G06V 20/63 |
| 2020/0246977 A1* | 8/2020 | Swietojanski ......... B25J 9/1697 |
| 2020/0265494 A1 | 8/2020 | Glaser |
| 2020/0324976 A1 | 10/2020 | Diehr |
| 2020/0356813 A1 | 11/2020 | Sharma |
| 2020/0380226 A1 | 12/2020 | Rodriguez |
| 2020/0387858 A1 | 12/2020 | Hasan |
| 2021/0049541 A1 | 2/2021 | Gong |
| 2021/0142105 A1 | 5/2021 | Siskind |
| 2021/0150231 A1 | 5/2021 | Kehl |
| 2021/0192780 A1 | 6/2021 | Kulkarni |
| 2021/0216954 A1 | 7/2021 | Chaubard |
| 2021/0272269 A1* | 9/2021 | Suzuki .................... G06F 3/167 |
| 2021/0319684 A1 | 10/2021 | Ma |
| 2021/0342914 A1 | 11/2021 | Dalal |
| 2021/0400195 A1* | 12/2021 | Adato .............. G06Q 10/06312 |
| 2022/0043547 A1 | 2/2022 | Jahjah |
| 2022/0051179 A1 | 2/2022 | Savvides |
| 2022/0058425 A1 | 2/2022 | Savvides |
| 2022/0067085 A1 | 3/2022 | Nihas |
| 2022/0114403 A1 | 4/2022 | Shaw |
| 2022/0114821 A1 | 4/2022 | Arroyo |
| 2022/0138914 A1 | 5/2022 | Wang |
| 2022/0165074 A1 | 5/2022 | Srivastava |
| 2022/0222924 A1 | 7/2022 | Pan |
| 2022/0262008 A1 | 8/2022 | Kidd |

FOREIGN PATENT DOCUMENTS

| | | |
|---|---|---|
| CN | 110443298 B | 2/2022 |
| CN | 114898358 A | 8/2022 |
| EP | 3217324 A1 | 9/2017 |
| EP | 3437031 | 2/2019 |
| EP | 3479298 | 5/2019 |
| WO | 2006113281 A2 | 10/2006 |
| WO | 2017201490 A1 | 11/2017 |
| WO | 2018093796 | 5/2018 |
| WO | 2020051213 A1 | 3/2020 |
| WO | 2021186176 A1 | 9/2021 |
| WO | 2021247420 A2 | 12/2021 |

OTHER PUBLICATIONS

Paolanti, Marine et al.; "Mobile robot for retail surveying and inventory using visual and textual analysis of monocular pictures based on deep learning"; European Conference on Mobile Robots; Sep. 2017, 6 pages.
Verma, Nishcal et al.; "Object identification for inventory management using convolutional neural network"; IEEE Applied Imagery Pattern Recognition Workshop (AIPR); Oct. 2016, 6 pages.
U.S. Appl. No. 17/963,787, filed Oct. 11, 2022, Lingfeng Zhang.
U.S. Appl. No. 17/963,802, filed Oct. 11, 2022, Lingfeng Zhang.
U.S. Appl. No. 17/971,350, filed Oct. 21, 2022, Jing Wang.
U.S. Appl. No. 16/991,885; Office Action mailed Sep. 20, 2021 (pp. 1-13).
U.S. Appl. No. 16/991,885; Final Rejection mailed Mar. 7, 2022; (pp. 1-13).
U.S. Appl. No. 16/991,885; Notice of Allowance and Fees Due (PTOL-85) mailed Aug. 24, 2022; (pp. 1-13).
Tonioni, Alessio, et al.; "A deep learning pipeline for product recognition on store shelves"; 2018 IEEE International Conference on Image Processing, Applications and Systems (IPAS); Dec. 12-14, 2018; IEEE; <https://ieeexplore.ieee.org/document/8708890>; pp. 25-31.
Retech Labs; "Storx | RetechLabs"; <https://retechlabs.com/storx/>; available at least as early as Jun. 22, 2019; retrieved from Internet Archive Wayback Machine <https://web.archive.org/web/20190622012152/https://retechlabs.com/storx/> on Dec. 1, 2022; pp. 1-4.
Trax Retail; "Image Recognition Technology for Retail | Trax"; <https://traxretail.com/retail/>; available at least as early as Apr. 20, 2021; retrieved from Internet Wayback Machine <https://web.archive.org/web/20210420132348/https://traxretail.com/retail/> on Dec. 1, 2022; pp. 1-14.
Tan, Mingxing et al.; "EfficientNet: Rethinking Model Scaling for Convolutional Neural Networks"; Proceedings of the 36th International Conference on Machine Learning; 2019; vol. 97; PLMR; <http://proceedings.mlr.press/v97/tan19a.html>; pp. 6105-6114.
Tan, Mingxing, et al.; "EfficientDet: Scalable and Efficient Object Detection"; 2020 IEEE/CVF Conference on Computer Vision and Pattern Recognition (CVPR); Jun. 13-19, 2020; IEEE; <https://ieeexplore.ieee.org/document/9156454>; pp. 10778-10787.

(56) References Cited

OTHER PUBLICATIONS

Schroff, Florian, et al.; "Facenet: a unified embedding for face recognition and clustering"; 2015 IEEE Conference on Computer Vision and Pattern Recognition (CVPR); Jun. 7-12, 2015; IEEE; <https://ieeexplore.ieee.org/document/7298682>; pp. 815-823.
Chaudhuri, Abon, et al.; "A Smart System for Selection of Optimal Product Images in E-Commerce"; 2018 IEEE Conference on Big Data (Big Data); Dec. 10-13, 2018; IEEE; <https://ieeexplore.ieee.org/document/8622259>; pp. 1728-1736.
U.S. Appl. No. 16/991,885; Notice of Allowance and Fees Due (PTOL-85) mailed Dec. 7, 2022; (pp. 1-13).
Ramanpreet Kaur, et al.; "A Brief Review on Image Stitching and Panorama Creation Methods"; International Journal of Control Theory and Applications; 2017; vol. 10, No. 28; International Science Press; Gurgaon, India; <https://www.researchgate.net/publication/348232877 >; 11 pages.
Chenze, Brandon, et al.; "Iterative Approach for Novel Entity Recognition of Foods in Social Media Messages"; 2022 IEEE 23rd International Conference on Information Reuse and Integration for Data Science (IRI); Aug. 9-11, 2022; IEEE; <https://ieeexplore.ieee.org/document/9874231>; pp. 126-131.
Naver Engineering Team; "Auto-classification of NAVER Shopping Product Categories using TensorFlow"; <https://blog.tensorflow.org/2019/05/auto-classification-of-naver-shopping.html>; May 20, 2019; pp. 1-13.
Technology Robotix Society; "Colour Detection"; <https://medium.com/image-processing-in-robotics/colour-detection-e15bc03b3f61>; Jul. 2, 2019; pp. 1-8.
U.S. Appl. No. 17/963,751, filed Oct. 11, 2022, Yilun Chen.
U.S. Appl. No. 17/963,903, filed Oct. 11, 2022, Raghava Balusu.
U.S. Appl. No. 17/966,580, filed Oct. 14, 2022, Paarvendhan Puviyarasu.
U.S. Appl. No. 17/983,773, filed Nov. 9, 2022, Lingfeng Zhang.
U.S. Appl. No. 18/102,999, filed Jan. 30, 2023, Han Zhang.
U.S. Appl. No. 18/103,338, filed Jan. 30, 2023, Wei Wang.
U.S. Appl. No. 18/106,269, filed Feb. 6, 2023, Zhaoliang Duan.
U.S. Appl. No. 18/158,925, filed Jan. 24, 2023, Raghava Balusu.
U.S. Appl. No. 18/158,950, filed Jan. 24, 2023, Ishan Arora.
U.S. Appl. No. 18/158,969, filed Jan. 24, 2023, Zhaoliang Duan.
U.S. Appl. No. 18/158,983, filed Jan. 24, 2023, Ashlin Ghosh.
U.S. Appl. No. 18/161,788, filed Jan. 30, 2023, Raghava Balusu.
U.S. Appl. No. 18/165,152, filed Feb. 6, 2023, Han Zhang.
U.S. Appl. No. 18/168,174, filed Feb. 13, 2023, Abhinav Pachauri.
U.S. Appl. No. 18/168,198, filed Feb. 13, 2023, Ashlin Ghosh.
U.S. Appl. No. 16/991,885; Notice of Allowance and Fees Due (PTOL-85) mailed Apr. 28, 2023; (pp. 1-8).
U.S. Appl. No. 16/991,885; Notice of Allowance and Fees Due (PTOL-85) mailed Dec. 23, 2022; (pp. 1-2).
Zhang, Jicun, et al.; "An Improved Louvain Algorithm for Community Detection"; Advanced Pattern and Structure Discovery from Complex Multimedia Data Environments 2021; Nov. 23, 2021; Mathematical Problems in Engineering; Hindawi; <https://www.hindawi.com/journals/mpe/2021/1485592/>; pp. 1-27.

* cited by examiner

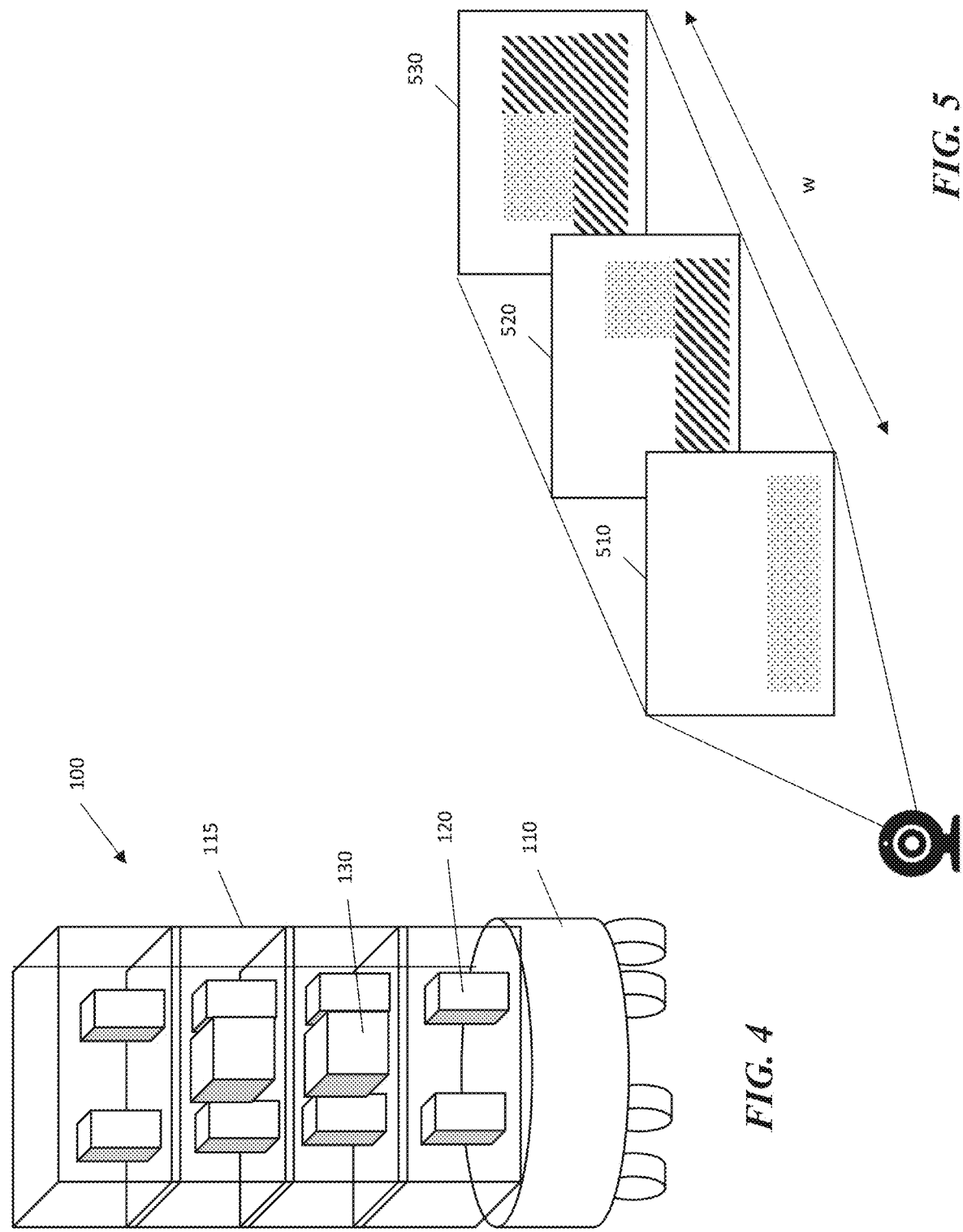

SYSTEMS, DEVICES, AND METHODS FOR ESTIMATING STOCK LEVEL WITH DEPTH SENSOR

This application claims the benefit of U.S. Provisional Application No. 62/885,695, filed Aug. 12, 2019 and U.S. Provisional Application No. 62/888,771, filed Aug. 19, 2019, both of which are incorporated herein by reference in their entirety.

TECHNICAL FIELD

These teachings relate generally to shopping environments and more particularly to devices, systems, and methods for scanning shelves in a shopping environment.

BACKGROUND

Placement and accuracy of price tags and products affect a customer's shopping experience and a store's sales. Conventionally, display shelves and labels are manually checked by store associates. The process can be time assuming and often lacks accuracy.

BRIEF DESCRIPTION OF THE DRAWINGS

The above needs are at least partially met through provision of embodiments of systems, devices, and methods designed to automated shelf scanning, such as described in the following detailed description, particularly when studied in conjunction with the drawings, wherein:

FIG. 4 comprises an illustration of a motorized unit in accordance with some embodiments; and FIG. 5 comprises an illustration of volume estimation in accordance with some embodiments.

Figure 1:
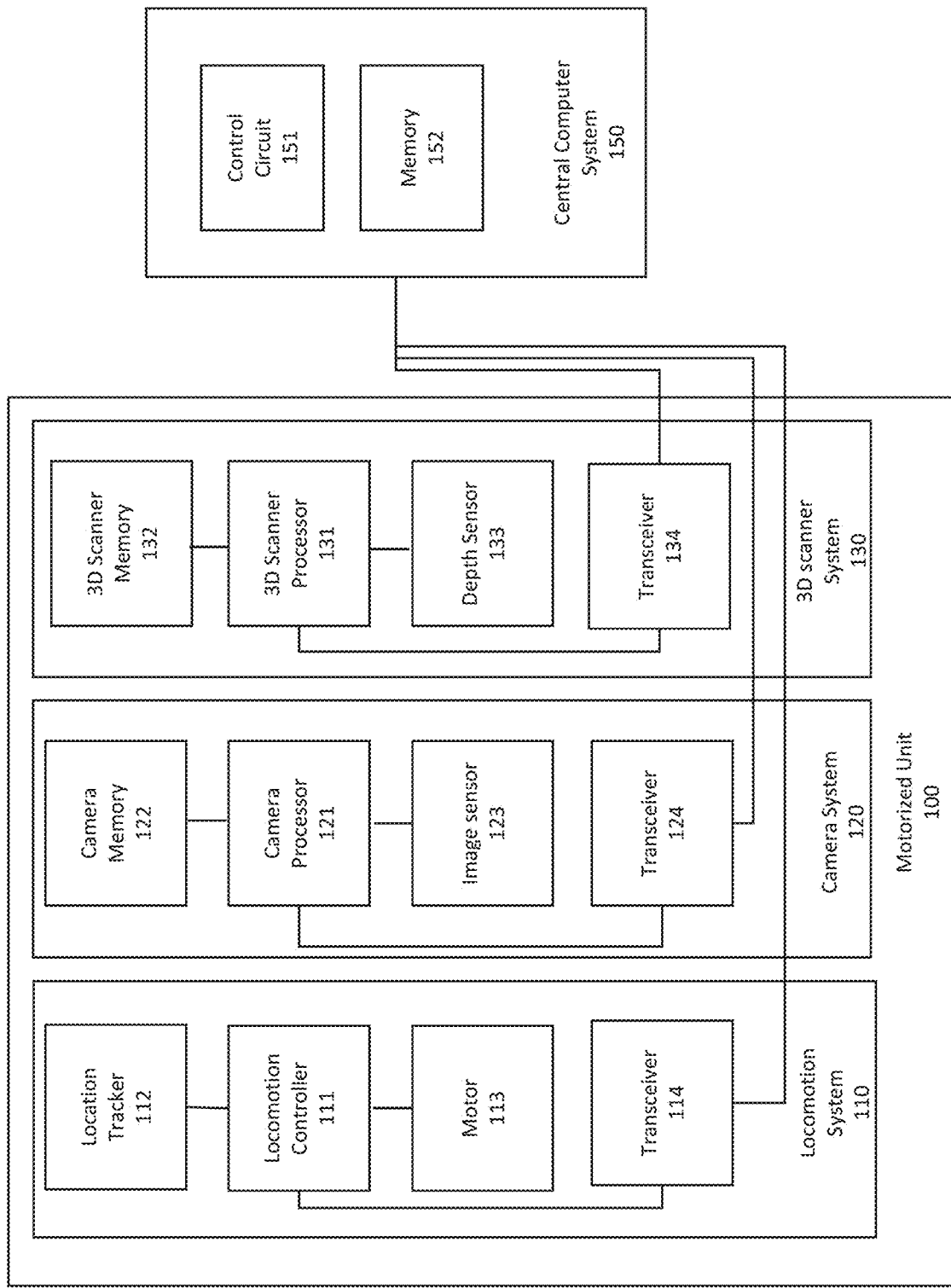
FIG. 1 comprises a block diagram of a system in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Systems and methods for store scanning are provided herein. In some embodiments, a system for scanning a shopping space comprises a locomotion system of a motorized unit configured to navigate the motorized unit in the shopping space and track a location of the motorized unit, the locomotion system comprises a locomotion controller and a motor, a camera system of the motorized unit configured to capture images, the camera system comprises an image sensor and a camera processor configured to extract item identifiers from the images captured by the image sensor, and a central computer system communicatively coupled to the locomotion system and the camera system over a wireless network. The central computer system comprises a control circuit configured to receive motorized unit location information from the locomotion system, the motorized unit location information comprises a plurality of sets of coordinates each associated with a timestamp, receive item identifier instances from the camera system, wherein each item identifier instance is associated with a timestamp, and determine a location for each item identifier instance based on the timestamps associated of the item identifier instances and the timestamps associated with the plurality of sets of coordinates of the motorized unit location information.

In some embodiments, the system includes edge computing, sensors and cameras, a backend server machine intelligence system, and a frontend visualization. The system integrates and controls a mobile unit and scans price tags and inventory using a combination of computer vision, location awareness, and algorithms and architectures to calculate and infer the precise locations of item price tags and determine inventory stock levels. In some embodiments, the system utilizes the (x,y) coordinates obtained from the robot and images of price tags as a proxy for price tag locations. The (x,y) locations of the robot are projected to the shelves to identify the location of the price tags. In some embodiments, the system utilizes processes and architecture that merges the imaging information and coordinate information to determine the approximate location of the price tag image instance. The system is further configured to determine which of the image instances of price tags corresponds to the same price tag(s) and can discern between multiple image instances of price tags that are scanned from the same product at the same location and the same product at multiple locations. In some embodiments, the vision systems on the edge function independently with the control chip onboard. The information gathered by the vision system and the control chip are only combined at the backend.

FIG. 1 illustrates a block diagram of a system for shopping space scanning in accordance with various embodiments of these teachings. The system includes a motorized unit 100 and a central computer system 150. The motorized unit 100 comprises a locomotion system 110, a camera system 120, and a 3D scanner system 130.

The locomotion system 110 comprises a locomotion controller 111, a location tracker 112, a motor 113, and a transceiver 114. The locomotion system 110 is generally configured to carry and camera system 120 and the 3D scanner system 130 and travel in a shopping space. The locomotion controller 111 may be one or more of a processor, a microprocessor, a single board computer, a control circuit, an application specific integrated circuit (ASIC) and the like. In some embodiments, the locomotion controller 111 may be configured to drive and steer the motorized unit 100 based on instructions received from the central computer system 150. In some embodiments, the locomotion system 110 may be remote-controlled by the central computer system 150. In some embodiments, the locomotion system 110 may comprise an autonomous or semi-autonomous vehicle configured to travel for an extended period of time without communicating with the central computer system 150. For example, an assigned route may be stored on a local memory of the locomotion system 110 at the beginning of the trip and the locomotion system 110 may use one or more onboard sensors to navigate the motorized unit 100 to complete the assigned route while avoiding obstacles. The locomotion controller 111 is further configured to report the location of the motorized unit 100 to the central computer system 150. In some embodiments, location information comprises a plurality of sets of coordinates each associated with a timestamp and may be transmitted in real-time, transmitted periodically, or uploaded at the completion of the trip. In some embodiments, the locomotion controller 111 may be configured to detect a loss of network connection to the central computer system and store the location information on a local memory to upload when the network connection is restored.

The location tracker 112 generally refers to a hardware and/or software module configured to determine the location of the motorized unit 100. In some embodiments, the location tracker may comprise a simultaneous location and mapping (SLAM) module based on one or more of environmental feature tracking, inertial measurement unit (IMU) measurement, kinematic modeling, and odometer data. In some embodiments, the location tracker 112 may comprise an in-door positioning system sensor such as a Wi-Fi transceiver, a Bluetooth beacons sensor, a magnetic positioning sensor, a dead reckoning module and the like.

The motor 113 is generally configured to drive wheels of the motorized unit 100 to drive and steer the motorized unit. The transceiver 114 is generally configured to allow the locomotion controller 111 to wirelessly exchange data with the central computer system 150. In some embodiments, the transceiver 114 may comprise one or more of a Wi-Fi transceiver, a Bluetooth transceiver, a mobile data transceiver, and the like. The locomotion system 110 may receive travel instructions from the central computer system 150 and/or upload motorized unit location information to the central computer system 150 via the transceiver 114. In some embodiments, the locomotion system 110 may further receive a time synchronization signal from the central computer system 150 to synchronize the internal clocks of the components of the motorized unit 100. In some embodiments, the locomotion system 110 further comprises navigation sensors such as image sensors and range/depth sensors that are used to navigation the motorized unit 100 and are independent of the camera system 120 and the 3D scanner system 130.

The camera system 120 comprises a camera processor 121, a camera memory 122, an image sensor 123, and a transceiver 124. The camera system 120 is generally configured to capture and process images in the shopping space. In some embodiments, the camera system 120 further configured to extract item identifiers from the captured images. Item identifiers generally refer to a code that identifies a product for sale such as a QR code, a barcode, a UPC number, and the like. In some embodiments, the camera system 120 may capture other information on price tags such as product name, product description, and listed price using image and/or text recognition algorithms. The camera processor 121 is further configured to report the captured product identifier instances to the central computer system 150. In some embodiments, product identifier instances comprise detected product identifiers each associated with a timestamp and may be transmitted in real-time, transmitted periodically, or uploaded at the completion of the trip. In some embodiments, the camera processor 121 may be configured to detect a loss of network connection to the central computer system and store the location information on a camera memory 122 to upload when the network connection is restored. The camera memory 122 may be any volatile or non-volatile computer memory storage device such as a hard drive, a solid-state drive, a flash storage device, and the like. In some embodiments, the camera processor 121 may further be configured to transmit captured images to the central computer system 150. In some embodiments, the camera processor 121 is configured to periodically query the central computer system to determine whether the locomotion system has completed a trip and continuously capture images at set intervals until completion of the trip is detected. In some embodiments, after the completion of the trip is detected, the camera system 120 will continue to upload any item identifier instances captured during the trip and notify the central computer system 150 when the upload is completed.

The image sensor 123 generally comprises a sensor configured to read item identifiers from shelf labels. In some embodiments, the camera system 120 may comprise a plurality of optical sensors positioned at different heights and/or orientations. For example, image sensors 123 of a camera system 120 may be placed at two or more heights each approximating the heights of shelf levels. In some embodiments, image sensors 123 may point in opposite directions to capture images from both sides of an aisle as the motorized unit 100 travels down an aisle.

The transceiver 124 is generally configured to allow the camera system 120 to wirelessly exchange data with the central computer system 150. In some embodiments, the transceiver 124 may comprise one or more of a Wi-Fi transceiver, a Bluetooth transceiver, a mobile data transceiver, and the like. The camera system 120 may receive a time synchronization signal and scanning instructions from the central computer system 150 via the transceiver. In some embodiments, the scanning instructions may comprise a start time and/or a scanning frequency (e.g. every second, every 2 seconds, etc.). In some embodiments, the camera system 120 may further receive a termination signal to end the periodic scanning. In some embodiments, the camera system 120 is configured to upload scanned item identifiers and/or captured images to the central computer system via the transceiver 124. In some embodiments, the camera system 120 is configured to capture images and extract item identifiers for an extended period of time without communicating with the central computer system 150.

In some embodiments, the camera system 120 is a removable module of the motorized unit 100 with no data connection to the locomotion system 110, such that removal of the camera system 120 does not affect the operations and the configurations of the locomotion system 110. In some embodiments, a motorized unit 100 may comprise a plurality of camera systems 120 that are each configured to capture and process images and communicate with the central computer system 150 independent of each other. In some embodiments, one or more camera systems 120 and/or the locomotion system 110 may share a power source such as a battery.

The 3D scanner system 130 comprises a 3D scanner processor 131, a 3D scanner memory 132, a depth sensor 133, and a transceiver 134. The 3D scanner system 130 is generally configured to capture and process depth information. In some embodiments, the 3D scanner system 130 may capture a 3D point cloud from storage areas in the shopping space. The 3D scanner processor is configured to identify a 3D space associated with a storage area and perform volume estimation of the 3D space based on the captured 3D point cloud. In some embodiments, the 3D scanner system 130 may further comprise a 2D image sensor that captures color images. In some embodiments, the 3D scanner system 130 may use images captured by the camera system 120 to determine the boundaries of a storage space. The 3D scanner system 130 may further be configured to report the volume estimation to the central computer system 150. In some embodiments, each volume estimation is associated with a timestamp and may be transmitted in real-time, transmitted periodically, or uploaded at the completion of the trip. In some embodiments, the 3D scanner processor 131 may be configured to detect a loss of network connection to the central computer system and store the location information on a 3D scanner memory 132 to upload when the network connection is restored. The scanner memory 132 may be any volatile or non-volatile computer memory storage device such as a hard drive, a solid-state drive, a flash storage device, and the like. In some embodiments, the camera processor 121 is configured to periodically query the central computer system to determine whether the locomotion system 110 has completed a trip and continuously perform volume estimations at set intervals until the completion of the trip is detected. In some embodiments, after the completion of the trip is detected, the 3D scanner system 130 may continue to upload any volume estimation data captured during the trip and notify the central computer system 150 when the upload is completed. In some embodiments, the 3D scanner system 130 is configured to estimate stock levels of a plurality of storage areas for an extended period of time without communicating with the central computer system 150.

The depth sensor 133 generally comprises a sensor configured to measure the distance between the sensor and a plurality of points in front of the sensor. In some embodiments, the depth sensor 133 may comprise one or more of a time-of-flight camera (e.g. lidar), a triangulation scanner (e.g. laser scanner), a stereoscopic camera, a structured light scanner, and the like. In some embodiments, the 3D scanner system 130 may comprise a plurality of depth sensors positioned at different heights and/or orientations. For example, depth sensors 133 of a 3D scanner system 130 may be placed at two or more heights each approximating the heights of shelf levels. In some embodiments, depth sensors 133 may point in opposite directions to perform scans on both sides of an aisle as the motorized unit 100 travels down an aisle.

The transceiver 134 is generally configured to allow the 3D scanner system 130 to wirelessly exchange data with the central computer system 150. In some embodiments, the transceiver 134 may comprise one or more of a Wi-Fi transceiver, a Bluetooth transceiver, a mobile data transceiver, and the like. The 3D scanner system 130 may receive a time synchronization signal and scanning instructions from the central computer system 150 via the transceiver 134. In some embodiments, the scanning instructions may comprise a start time and/or a scanning frequency. In some embodiments, the 3D scanner system 130 may further receive a termination signal to end the periodic scanning. In some embodiments, the 3D scanner system 130 is configured to upload volume estimations and/or captured point clouds to the central computer system 150 via the transceiver 134. In some embodiments, the 3D scanner system 130 may make use of images captured by the camera system 120 that is transmitted via the central computer system 150 and/or received directly from the camera system 120 via a wired or wireless connection.

In some embodiments, the 3D scanner system 130 is a removable module of the motorized unit with no data connection to the locomotion system 110, such that removal of the 3D scanner system 130 does not affect the functions or the configuration of the locomotion system 110. In some embodiments, a motorized unit 100 may comprise a plurality of 3D scanner systems 130 that are each configured to capture and process scans and communicate with the central computer system 150 independent of each other. In some embodiments, one or more 3D scanner systems 130 and/or the locomotion system 110 may share a power source such as a battery. In some embodiments, the 3D scanner system 130 may be optional to the motorized unit 100. For example, for a motorized unit 100 that only scans shelf labels but does not perform stock level estimation, the 3D scanner system 130 may be omitted.

An example configuration of a motorized unit 100 is shown in FIG. 4. In FIG. 4, the motorized unit 100 comprises a locomotion system 110 and a plurality of camera systems 120 and 3D scanner systems 130 supported by a frame structure 115. The camera systems 120 and 3D scanner systems 130 are positioned at different heights that may correspond to levels of shelves in the shopping space. One or more of the camera systems 120 and the 3D scanner systems 130 may be pointed in different directions.

The central computer system 150 includes a control circuit 151 and a memory 152 and may be generally referred to as a processor-based device, a computing device, a server, a backend system, and the like. In some embodiments, the central computer system 150 may be implemented with one or more physical processor-based devices.

The central computer system 150 has stored on its memory 152 a set of computer-readable instructions that is executable by the control circuit 151 to cause the control circuit 151 to obtain motorized unit location information from the locomotion system 110 and item identifier information from the camera system 120 and correlate them to map out item identifier locations based on their timestamps. In some embodiments, the central computer system 150 is further configured to receive volume estimation information from the 3D scanner system 130 and estimate stock levels in storage spaces. In some embodiments, the central computer system 150 is also configured to provide navigation instructions to the locomotion system 110 and scanning instructions to the camera system 120 and/or 3D scanner system 130. In some embodiments, the central computer system 150 tracks the completion of a trip by the locomotion system 110 and instructs the camera system 120 and the 3D scanner system 130 to stop capturing images and scans when the trip is completed. In some embodiments, the central computer system 150 synchronizes the internal clocks of two or more of the locomotion system 110, the camera system 120, and the 3D scanner system 130. In some embodiments, the central computer system 150 is configured to map the shopping space by mapping item identifier location to a 3D model of the shopping space using a key-point based algorithm that then employs bi-linear interpolation. The map may be used by customers, store associates, or autonomous units to locate items in the shopping space. In some embodiments, the central computer system 150 may further generate associate and/or autonomous unit tasks based on information received from the motorized unit 100. For example, if a price tag does not comply with a planogram (e.g. wrong location or error in content), a corrective task may be generated. In another example, when the stock level is detected to fall below a threshold (e.g. 50%, 30%, etc.) a restocking task may be generated. While one motorized unit 100 is shown in FIG. 1, the central computer system 150 may simultaneously exchange data with a plurality of motorized units 100 traveling in one or more shopping spaces.

Figure 2:
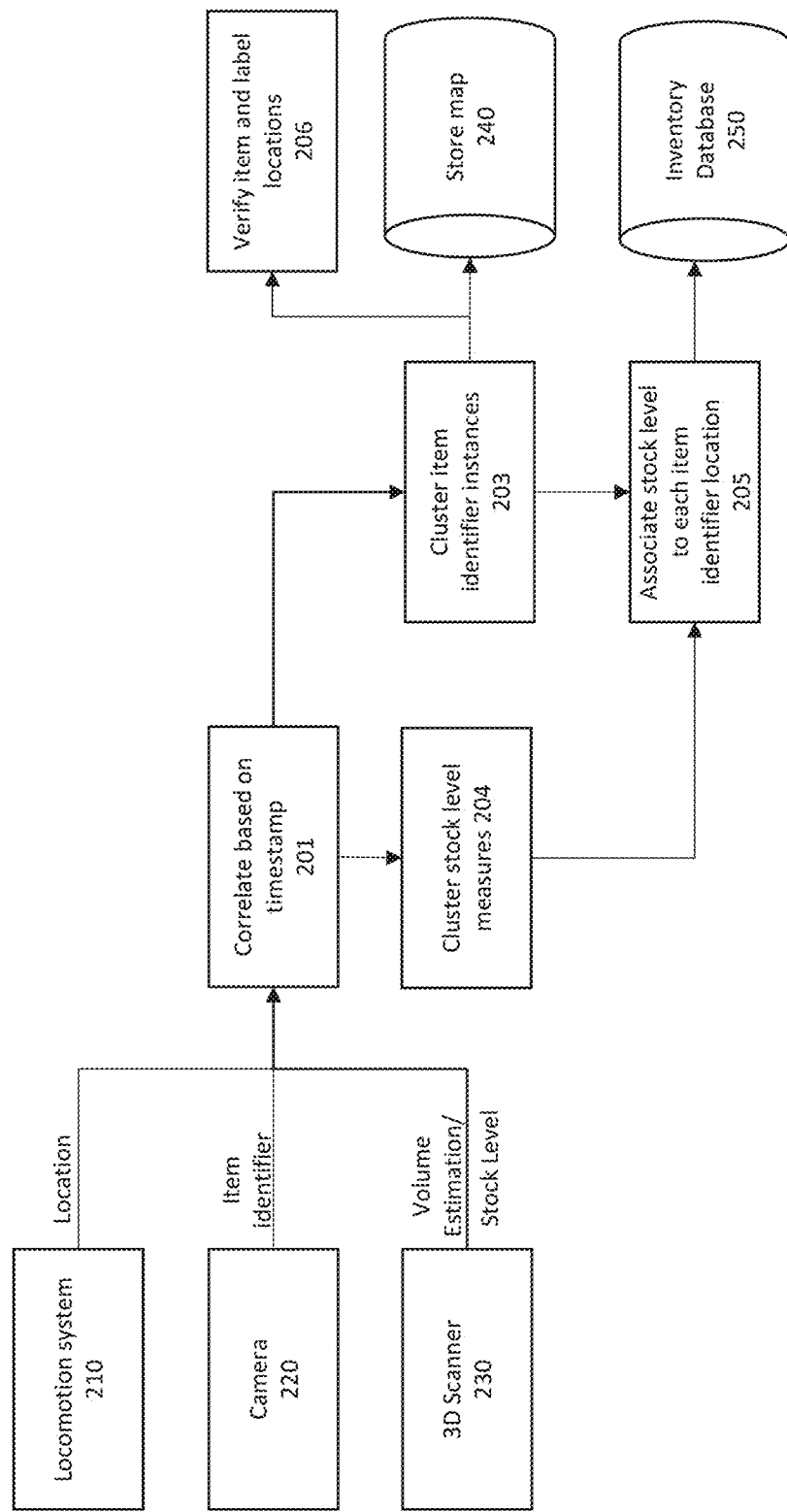
FIG. 2 comprises a flow diagram of a method in accordance with some embodiments.

FIG. 2 shows a flow diagram of a method for scanning a shopping space in accordance with some embodiments of these teachings. The steps shown in FIG. 2 may be performed by one or more of the locomotion system 110, the camera system 120, the 3D scanner system 130, and the central computer system 150 described with reference to FIG. 1 In some embodiments, the steps are performed by one or more processor-based devices executing computer readable instructions stored on one or more memory devices.

The system takes as input, motorized unit location information from a locomotion system 210, item identifier instances from a camera system 220, and volume estimation from a 3D scanner system 230. Location information comprises a plurality of sets of coordinates (x, y) each associated with a timestamp. Item identifier instances comprise an item code associated with a timestamp. In some embodiments, item identifier may further comprise a camera identifier such that the central computer system may identify the position of the camera on the motorized unit (e.g. left facing, right facing, height, etc.) Volume estimation generally refers to an estimation of the fullness of a storage area (e.g. shelf, bin). Volume estimation may also be referred to as stock level and may be presented as a fullness percentage (e.g. 30%, 50%, etc.), a volume measurement (e.g. 1.5 cubic meters), and/or a 3D shape. The camera system 220 and the 3D scanner system 230 may comprise independent systems carried on the locomotion system 210.

In step 201, the system correlates the motorized unit location coordinates, the item identifiers, and volume estimations based on their respective time stamps. For example, the system may determine a location for each item identifier instance based on the timestamps associated of the item identifier instances and the timestamps associated with the plurality of sets of coordinates of the motorized unit location information. In some embodiments, step 201 may be performed continuously as data is received or be triggered at the end of a trip.

In one example process for correlating location information with item identifier and/or volume estimation data, the location data is considered the base truth. A map (Map_Loc) of the location data is created and sorted according to the natural ordering of its timestamp values. Item identifier data(item_list) and stock level data(stock_list) within the lowest timestamp(min_ts) and highest timestamp(max_ts) in the location data are retrieved. For every item code in item_list, the timestamp (itemCode_ts) is mapped to the nearest neighbor in both the Map_Loc and stock_list. The system may first check for a direct mapping between timestamp values from item_list and stock_list to Map_Loc. If no nearest neighbor greater than a threshold distance (Dt) is found, then the system interpolates between C1(x1,y1) and C2(x2,y2) where C1 and C2 are points used to compute threshold distance Dt. The new threshold distance is then used to check for nearest neighbors and assign the corresponding value.

In step 203, item identifier instances are clustered to group item identifier instances associated with the same item identifier in the shopping space. In some embodiments, the system may create grids along the X and Y direction respectively to forms M×N grids. For each grid in the M×N grids, the system may average the coordinates (x, y) of item identifier instances in the group, and verify that each item identifier in the grid is unique and has one pair of coordinates. With the grid approach, labels for items that are stored in multiple locations would not be merged. In some embodiments, step 203 may be performed with data received from multiple motorized units performing scans in a shopping space such that item identifier instances of the same item identifier captured by different motorized units are grouped.

In some embodiments, the locations of the item identifier may then be used to update the store map 240. In some embodiments, the system may map the item identifier location to a 3D model of the shopping space using a key-point based algorithm that then employs bi-linear interpolation. The map may be used by customers, store associates, or autonomous units to locate items in the shopping space. In some embodiments, the system may further use the item identifier locations determines in step 203 to verify item and label locations for planogram compliance in step 206. For example, the system may compare the images captured by the camera system 220 and/or the 3D scanner 230 system with the detected item identifiers at the same location to determine whether images of the storage area matches the characteristics (e.g shape, size, color, text, etc.) of the item associated with the item identifier.

In step 204, measured stock levels are similarly clustered. In some embodiments, the system may create grids in the X and Y direction for different shelf heights such that each cell approximates a storage space (e.g. bin). In some embodiments, the system may refine stock level estimation by averaging or selecting from estimated stock levels associated with the same storage area. In some embodiments, the system may determine the mean or the medium of stock level estimations associated with a cell of the grid to increase the accuracy of the estimation. In some embodiments, the system may select one stock level measurement in each grid based on the location of the scans within the grid to select a measurement that is performed at a preferred angle (e.g. most aligned with the center of the bin). In some embodiments, the system may select scan(s) with the least amount of obstruction (e.g. least amount of points that is significantly forward of the access plane). In some embodiments, step 204 may be performed with data received from multiple motorized units performing scans in a shopping space.

In step 205, the estimated stock level is associated with the item identifier. In some embodiments, the association may be based on the grid approached and/or the closest neighbor approach. The estimated stock level associated with the item identifier is then used to update the inventory database 250. In some embodiments, the estimated stock level may be used to trigger a restocking task for the associated item and/or item location.

In some embodiments, the process shown in FIG. 2 may be repeated periodically and/or continuously monitor the shelves of a shopping space. In some embodiments, for a system without a 3D scanner, steps 204 and 205 may be omitted.

Figure 3:
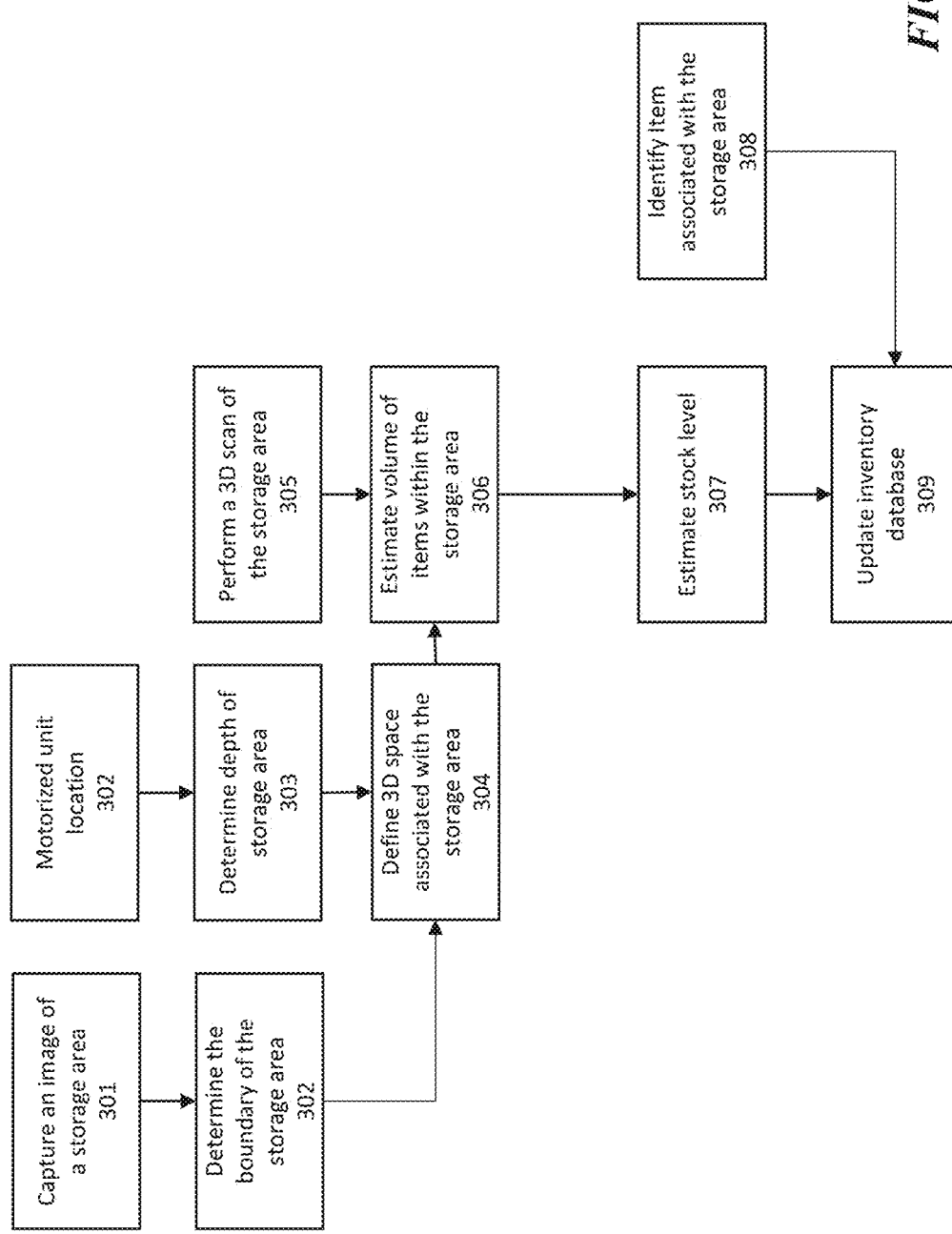
FIG. 3 comprises a flow diagram of a method in accordance with some embodiments.

FIG. 3 shows a flow diagram of a method for estimating stock level in a shopping space in accordance with some embodiments of these teachings. The steps shown in FIG. 3 may be performed by one or more of the locomotion system 110, the camera system 120, the 3D scanner system 130, and the central computer system 150 described with reference to FIG. 1. In some embodiments, the steps are performed by one or more processor-based devices executing computer readable instructions stored on one or more memory devices.

In step 301, the system captures an image of a storage area. In some embodiments, the image may be captured by a 2D camera of the 3D scanner system 130 or the camera system 120 described with reference to FIG. 1. In step 302, the system determines the boundary of the access plane of the storage area. In some embodiments, step 302 may be performed based on one or more of a convolutional neural network (CNN), an AI algorithm, and/or image recognition algorithm. In some embodiments, if two or more items share a storage space, the system may further perform image recognition to subdivide a storage area into sections associated with different items.

In step 302, the system retrieves the location of the motorized unit. In step 303, the system determines the distance from the 3D scanner to the access plane and the rear plane of the storage area. In some embodiments, the location of the motorized unit may be compared to a map of the shopping space to measure the distance between the motorized unit to the access plane of the storage area. In some embodiments, instead of using the motorized unit location from step 305, the system may use the dimension of the access plane as seen in the image of the storage area captured in step 301 to calculate the distance between the 3D scanner and the storage area. In some embodiments, the depth scanner used to perform the 3D scan in step 305 may measure a distance between the sensor and the access plane. In such embodiments, the 3D scanner does not use motorized unit location information. The distance to the rear plane of the shelf may be calculated from the location of the access plane of the shelf and the known depth of the storage area. In some embodiments, the depth of the storage area is determined based on identifying one or more of a storage area type and a storage area location. For example, a shopping space may have several different types of storage areas (e.g. pallets, bins, shelves, refrigerators, etc.). The system may first determine the storage type by scanning for a storage area or item identifier, locating the locomotion system on a store map, or based on the dimension of the access plane. The known depth of the storage type may then be used in step 303. In step 304, the boundary information (height, width) and the depth information are combined to define a 3D space associated with the storage area. The 3D space generally corresponds to the available storage volume of the storage area.

In step 305, the system performs a 3D scan of the storage area. In some embodiments, the 3D scan may be performed by the depth sensor 133 described with reference to FIG. 1. In some embodiments, step 305 is triggered by step 302. For example, when an image analysis identifies a storage area, the depth scanner is triggered to perform depth measurements. In some embodiments, the 3D scan outputs a point cloud. In step 306, the 3D space associated with the storage area determined in step 304 is isolated from the scan captured at step 305 for volume measurement. Since items are generally picked from the front of the storage area, detected points are projected on to planes behind it to compute the total volume based on the following equation:

$$\text{Total Volume} = \int_{w=1}^{w=n} A(w)dw$$

An example of the projection is shown in FIG. 5 where points detected in the first plane 510 are projected onto the second plane 520 and points from both planes are projected onto the third plane 530. In some embodiments, the system may exclude points that are significantly forward of the access plane of the storage area. Such points may correspond to customers or other objects that are not in the storage area. In some embodiments, multiple scans may be combined to subtract objects obscuring the storage area from the point cloud. In some embodiments, the 3D scanner system or a central computer system may further be configured to combine 3D scans of the storage area from multiple angles to estimate the occupied volume. For example, multiple scans may be combined into a 3D model of the occupied volume in the storage space.

In Step 307, the stock level associated with the storage area is estimated. In some embodiments, the stock level may be determined based on the measured volume of items as compared to the capacity of the storage area. For example, stock level may be determined to be 20%, 30%, etc. based on the volume estimation alone without having to identify the item in the storage area. In some embodiments, a smoothing function may be applied to the captured 3D volume prior to calculating the volume to account for irregularly shaped items (e.g. bottles with handles, necks, etc.). In some embodiments, the system may first identify the item in the storage area either with image recognition or by scanning an item identifier on a label marking the storage space and determine the amount smoothing to apply to the measured 3D volume based on the known shape of the item. In some embodiments, a standard threshold smoothing function may be applied without identifying the items in the storage area. For example, the system may determine that cavities below a certain size threshold does not reflect the absence of an item and ignore these cavities in the stock level estimation. In storage areas storing multiple items, stock level may be estimated separately for each item. In some embodiments, the 3D scanner processor may perform step 204 described with reference to FIG. 2 to estimate stock level. In some embodiments, step 307 may be performed locally by the 3D scanner processor or may be performed at a central computer system.

In step 308, the item associated with the storage area is identified. In some embodiments, the item may be identified based on the process described with reference to FIG. 2. In some embodiments, an item identifier may be extracted from the image taken in step 301 or by a different device. In step 309, the estimated stock level determined in step 307 is used to update the inventory database entry associated with the item identifier identified in step 308. In some embodiments, the estimated stock level may instead be associated with a storage area identifier and/or a storage area location in the inventory database. In some embodiments, stock levels may be separately tracked for items stored in multiple locations. In some embodiments, instead of or in addition to updating the inventory database, the system may generate a task to restock the storage area if the stock level falls below a threshold (e.g. 50%, 30%).

In some embodiments, a system for scanning a shopping space comprises a locomotion system of a motorized unit configured to navigate the motorized unit in the shopping space, the locomotion system comprises a locomotion controller and a motor and a 3D scanner system of the motorized unit configured to perform 3D scans. The 3D scanner system comprises a depth sensor and a 3D scanner processor configured to identify a 3D space associated with a storage area, estimate an occupied volume in the 3D space associated with the storage area based on a 3D scan from the depth sensor, and estimate a stock level of the storage area based on the occupied volume. A central computer system is communicatively coupled to the locomotion system and the 3D scanner system over a wireless network. The central computer system comprises a control circuit configured to receive estimated stock levels from the 3D scanner system and update an inventory database based on the estimated stock levels received from the 3D scanner.

In some embodiments, a method for scanning a shopping space comprises providing, from a central computer system, travel instructions to a locomotion system of a motorized unit, wherein the locomotion system comprises a locomotion controller and a motor and is configured to navigate the motorized unit in the shopping space, receiving, at the central computer system, estimated stock levels from the 3D scanner system, wherein the 3D scanner system comprises a depth sensor and a 3D scanner processor configured to estimate an occupied volume in a 3D space associated with a storage area based on a 3D scan from the depth sensor and estimate a stock level of the storage area based on the occupied volume, and updating an inventory database based on the estimated stock levels received from the 3D scanner.

In some embodiments, an apparatus for scanning a shopping space comprises a non-transitory storage medium storing a set of computer readable instructions and a control circuit configured to execute the set of computer readable instructions which cause to the control circuit to: provide travel instructions to a locomotion system of a motorized unit, wherein the locomotion system comprises a locomotion controller and a motor and is configured to navigate the motorized unit in the shopping space, receive estimated stock levels from the 3D scanner system, wherein the 3D scanner system comprises a depth sensor and a 3D scanner processor configured to estimate an occupied volume in a 3D space associated with a storage area based on a 3D scan from the depth sensor and estimate a stock level of the storage area based on the occupied volume, and update an inventory database based on the estimated stock levels received from the 3D scanner.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A system for scanning a shopping space comprising:
   a locomotion system of a motorized unit configured to navigate the motorized unit in the shopping space, the locomotion system comprises a locomotion controller and a motor;
   a removeable camera system removably coupled to the motorized unit, the removeable camera system configured to capture and process images;
   a removeable 3D scanner system removably coupled to the motorized unit, the removeable 3D scanner system configured to perform 3D scans, the removable 3D scanner system communicatively coupled to the removeable camera system via a wireless network, the removeable 3D scanner system comprising a depth sensor and a 3D scanner processor configured to:
   identify a 3D space associated with a storage area, the 3D space having an access plane and a rear plane opposite the access plane, the removeable 3D scanner system using the images captured by the removeable camera system to determine boundaries of the storage area;
   identify a storage area type of the storage area among a plurality of storage area types each associated with a storage area depth;
   determine a distance to the rear plane of the storage area based on a measured distance to the access plane and a known depth of the storage area type associated with the storage area;
   estimate an occupied volume in the 3D space associated with the storage area based on a 3D scan from the depth sensor and the distance to the rear plane; and
   estimate a stock level of the storage area based on the occupied volume; and
   a central computer system communicatively coupled to the locomotion system, the removeable camera system and the removeable 3D scanner system over the wireless network, the central computer system comprises a control circuit configured to:
   receive estimated stock levels from the removeable 3D scanner system; and
   update an inventory database based on the estimated stock levels received from the removeable 3D scanner system.

2. The system of claim 1, wherein the removeable 3D scanner system is a removable module of the motorized unit with no data connection to the locomotion system and is configured to be removed without affecting functions or configurations of the locomotion system.

3. The system of claim 1, wherein the removeable 3D scanner is configured to estimate stock levels of a plurality of storage areas while not in communication with the central computer system.

4. The system of claim 1, wherein the removeable 3D scanner system is configured to identify the 3D space associated with the storage area by:
   receiving at least one captured image of the storage area from the removable camera system;
   detecting a boundary of the access plane of the storage area based on the at least one received image of the storage area;
   determining a distance from the depth sensor to the access plane of the storage area; and
   identify the 3D space based on the boundary of the access plane, the distance to the access plane, and the distance to the rear plane.

5. The system of claim 4, wherein the boundary of the access plane is identified via a convolution neural network algorithm.

6. The system of claim 1, wherein the removeable 3D scanner system is further configured to combine 3D scans of the storage area from multiple angles to estimate the occupied volume.

7. The system of claim 1, wherein the removeable 3D scanner system is further configured to apply a smoothing function to the 3D scan to estimate the stock level.

8. The system of claim 1, wherein the central computer system is further configured to determine a refined stock level estimation by averaging or selecting from estimated stock levels associated with the same storage area.

9. The system of claim 1, wherein the motorized unit further comprises an image sensor configured to capture item identifiers in a shopping space and the central computer system is configured to update the inventory database based on item identifiers associated with one or more estimated stock levels.

10. The system of claim 1, wherein the storage area type is determined based on scanning for a storage area identifier, scanning an identifier, or locating the locomotion system on a store map.

11. A method for scanning a shopping space comprising:
navigating, with a locomotion system of a motorized unit, the motorized unit towards a storage area in a shopping space, wherein the locomotion system comprises a locomotion controller and a motor;
capturing, with a removeable camera system removably coupled to the motorized unit, a plurality of images;
identifying, with a depth sensor of a removeable 3D scanner system removably coupled to the motorized unit, a 3D space associated with a storage area, the 3D space having an access plane and a rear plane opposite the access plane, the removeable 3D scanner system using at least one image of the plurality of images captured by the removable camera system to determine boundaries of the storage area;
identifying a storage area type of the storage area among a plurality of storage area types each associated with a storage area depth;
determining, with the removeable 3D scanner system, a distance to the rear plane of the storage area based on a measured distance to the access plane and a known depth of the storage area type associated with the storage area;
estimating, with the removeable 3D scanner system, an occupied volume in the 3D space associated with the storage area based on a 3D scan from the depth sensor and the distance to the rear plane;
estimating a stock level of the storage area based on the occupied volume; and
updating an inventory database based on the estimated stock levels received from the 3D scanner.

12. The method of claim 11, wherein the removeable 3D scanner system is a removable module of the motorized unit with no data connection to the locomotion system and is configured to be removed without affecting the locomotion system.

13. The method of claim 11, wherein the removeable 3D scanner system is configured to estimate stock levels of a plurality of storage areas while not in communication with a central computer system.

14. The method of claim 11, wherein the removeable 3D scanner system is configured to identify the 3D space associated with the storage area by:
receiving at least one captured image of the storage area from the removable camera system;
detecting a boundary of the access plane of the storage area based on the at least one received image of the storage area;
determining a distance from the depth sensor to the access plane of the storage area; and
identify the 3D space based on the boundary of the access plane, the distance to the access plane, and the distance to the rear plane.

15. The method of claim 14, wherein the boundary of the access plane is identified via a convolution neural network algorithm.

16. The method of claim 11, wherein the removeable 3D scanner system is further configured to combine 3D scans of the storage area from multiple angles to estimate the occupied volume.

17. The method of claim 11, wherein the removeable 3D scanner system is further configured to apply a smoothing function to the 3D scan to estimate the stock level.

18. The method of claim 11, further comprising:
determining a refined stock level estimation by averaging or selecting from estimated stock levels associated with the same storage area.

19. An apparatus for scanning a shopping space comprising:
a non-transitory storage medium storing a set of computer readable instructions; and
a control circuit configured to execute the set of computer readable instructions which cause to the control circuit to:
navigate, with a locomotion system of a motorized unit, the motorized unit towards a storage area in a shopping space, wherein the locomotion system comprises a locomotion controller and a motor;
capture, with a removeable camera system removably coupled to the motorized unit, a plurality of images;
identify, with a depth sensor of a removable 3D scanner system removably coupled to the motorized unit, a 3D space associated with a storage area, the 3D space having an access plane and a rear plane opposite the access plane, the removeable 3D scanner system using at least one image of the plurality of images captured by the removable camera system to determine boundaries of the storage area;
identify a storage area type of the storage area among a plurality of storage area types each associated with a storage area depth;
determine, with the removeable 3D scanner system, a distance to the rear plane of the storage area based on a measured distance to the access plane and a known depth of the storage area type associated with the storage area;
estimate an occupied volume in the 3D space associated with the storage area based on a 3D scan from the depth sensor and the distance to the rear plane;
estimate a stock level of the storage area based on the occupied volume;
and
update an inventory database based on the estimated stock levels received from the removable 3D scanner system.

* * * * *